United States Patent

[11] 3,604,035

[72] Inventor Grover Edward Hendricks
2241 Lake Street, Niles, Mich. 49120
[21] Appl. No. 703,025
[22] Filed Feb. 5, 1968
[45] Patented Sept. 14, 1971

[54] FLOATING TAP AND TAP HOLDER
5 Claims, 11 Drawing Figs.
[52] U.S. Cl. .................................................. 10/129,
10/141 H
[51] Int. Cl. ...................................................... B23g 1/00,
B23g 5/06, B23g 5/14
[50] Field of Search ........................................... 10/129,
141, 141 H, 89 F, 89 H, 129 WH, 148 T; 279/16,
18, 83, 87, 102, 103, 9; 77/68

[56] References Cited
UNITED STATES PATENTS

| | | | |
|---|---|---|---|
| 83,371 | 10/1868 | Foster | 10/141 |
| 586,419 | 7/1897 | Collet | 10/141 |
| 943,863 | 12/1909 | Clouse | 10/141 |
| 1,129,491 | 2/1915 | Housel | 10/141 |
| 2,424,113 | 7/1947 | Norberg et al. | 10/141 |
| 2,449,284 | 9/1948 | Dorman | 10/141 |
| 2,974,965 | 3/1961 | Welles | 10/141 |
| 3,256,541 | 6/1966 | Russo | 10/129 |
| 1,281,683 | 10/1918 | Spinney | 10/141 |
| 1,702,132 | 2/1929 | Redinger | 10/141 |
| 1,856,406 | 5/1932 | Wyrick | 10/141 |
| 3,096,668 | 7/1963 | Maynard | 77/68 |
| 3,364,800 | 1/1968 | Benjamin et al. | 77/68 |
| 3,460,410 | 8/1969 | Briles | 77/68 |
| 1,839,569 | 1/1932 | Lovejoy | 279/9 |
| 3,536,335 | 10/1970 | Schmuck | 279/87 |

FOREIGN PATENTS

| | | | |
|---|---|---|---|
| 140,615 | 4/1920 | Great Britain | 10/141 |

*Primary Examiner*—Charles W. Lanham
*Assistant Examiner*—E. M. Combs
*Attorney*—Eugene C. Knoblock ABSTRACT: A tap and tap holder combination in which the tap has an elongated straight fluted shank. The tap holder has a shank portion for mounting in a machine spindle and a socket portion having an axial socket bore and a longitudinal internal groove mounting a longitudinal lug therein. The tap is loosely mounted within the socket bore with the longitudinal lug projecting into the tap shank flute.

PATENTED SEP 14 1971
3,604,035
SHEET 1 OF 2
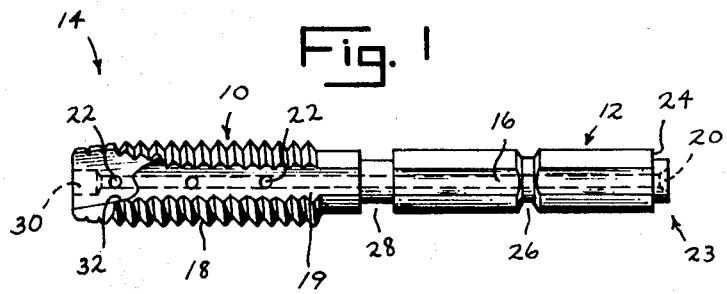
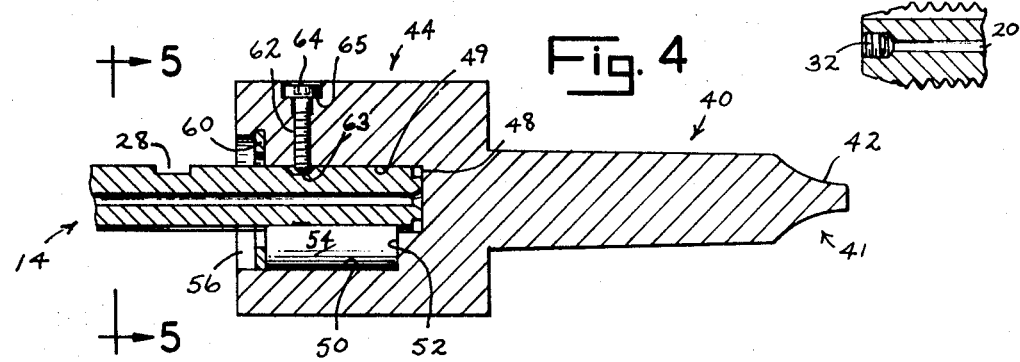
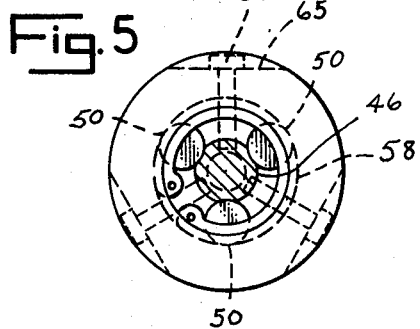
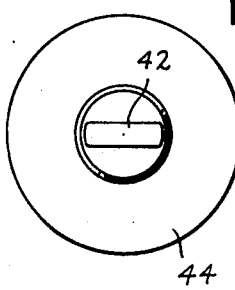
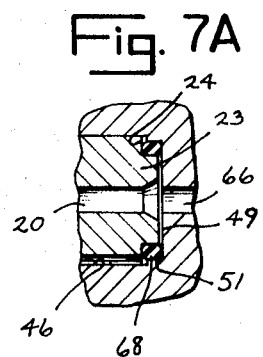
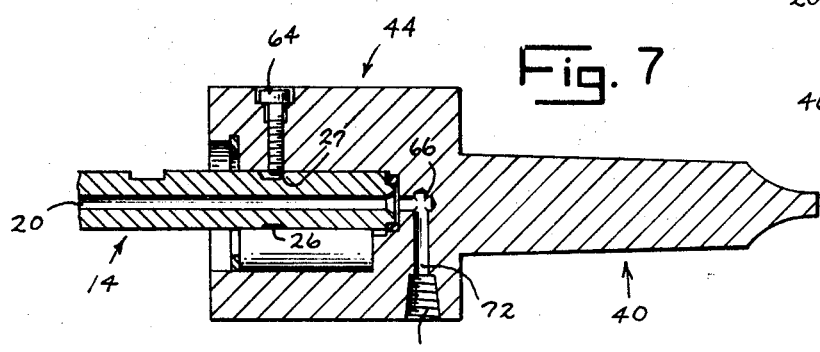
INVENTOR.
GROVER E. HENDRICKS
BY Eugene C. Kundock
ATTORNEY

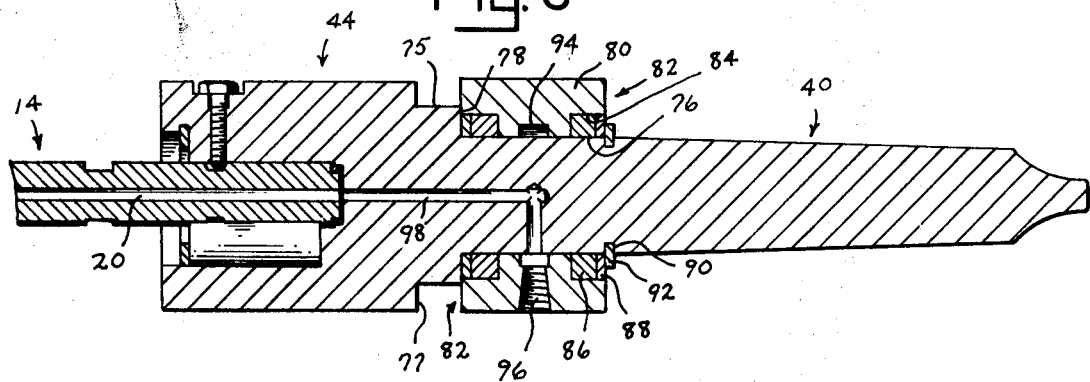
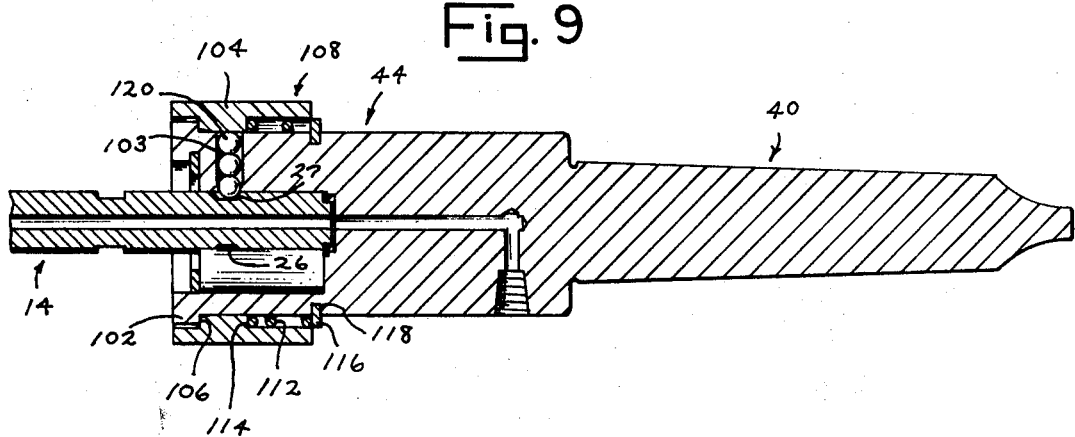
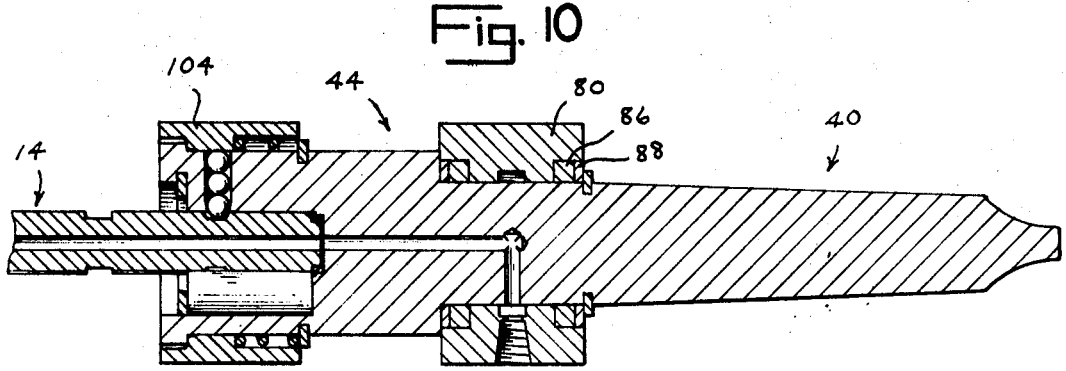
INVENTOR.
GROVER E. HENDRICKS
ATTORNEY

FLOATING TAP AND TAP HOLDER

SUMMARY OF THE INVENTION

This invention relates to a tap and tap holder in which the shank of the tap has at least one straight flute. The tap holder has a shank portion adapted for mounting in a machine spindle and a socket portion having an axial socket bore. The socket portion mounts therein at least one longitudinally directed lug member which projects into the bore. The tap shank is loosely mounted within the axial bore of the tap holder with the lug complementarily engaging the shank flute. A releasable retaining means carried by the tap holder detains the tap within the tap holder. The tap is driven by the engagement of the lug part within the shank flute.

The tap shank is so sized so that a slight clearance exists between the tap shank and holder socket bore in order to permit a limited wobbling or floating action of the tap relative to the holder. Due to the fact that the tap is permitted to wobble, have free play or "float" within the holder, it will have a tendency to be self-centering as it progresses into the bore of a workpiece, thereby insuring the accurate forming of a thread. Heretofore standard tap holders have utilized a split collet or bushing with one or more setscrews which engage flats formed in the end of the shank of the tap or other means to rigidly position the tap within the holder.

If it is desired to provide for tap cooling and chip removal during tapping operations, at least one longitudinal passageway is formed in the tap. This passageway communicates with a coolant conduit in the tap holder having its inlet adapted to be connected to a coolant supply means. In this manner coolant may be introduced into the tap and around the tap threads causing cooling of the tap and workpiece flushing of the chips from the workpiece bore. This tap passageway also serves to allow uniform heat treatment of the tap during its manufacture.

Accordingly, it is an object of this invention to provide a tap and tap holder in which the tap is free to float and is self-centering in operation.

It is also an object of this invention to provide a tap and a tap holder combination in which a coolant may flow so that the tap may be cooled and chips may simultaneously be removed from the bore of a workpiece.

Another object of this invention is to provide a tap of high quality and economical construction.

A further object of this invention is to provide a tap having means for efficiently cooling it and ensuring chip removal during use thereof.

Other objects of this invention will become apparent upon a reading of the invention's description.

BRIEF DESCRIPTION OF THE DRAWINGS

FIG. 1 is a side view of a tap utilized in this invention.

FIG. 2 is an end view of the tap of FIG. 1 as viewed from the right.

FIG. 3 is a fragmentary axial view of the cutting tip of the tap of FIG. 1 modified to include a plug inserted in the longitudinal passageway.

FIG. 4 is a longitudinal sectional view of an embodiment of the tap holder of this invention with a fragmentary sectional view of the tap of FIG. 1 mounted therein.

FIG. 5 is an end view of the tap and tap holder of FIG. 4 as viewed along line 5—5 of FIG. 4.

FIG. 6 is an end view of the tap and tap holder as shown in FIG. 4 as viewed from the right.

FIG. 7 is a fragmentary longitudinal sectional view of the tap and tap holder of FIG. 4 modified to include tap coolant means.

FIG. 7A is a detailed sectional view of the seal arrangement between the tap and tap holder of FIG. 7.

FIG. 8 is a fragmentary longitudinal sectional view of the tap and tap holder of FIG. 7 modified to include a slip collar for introducing coolant into a rotating tap holder.

FIG. 9 is a fragmentary longitudinal sectional view of the tap and tap holder of FIG. 7 modified to include detent means for retaining the tap within the tap holder.

FIG. 10 is a fragmentary longitudinal sectional view of the tap and tap holder of FIG. 9 modified to include a slip collar for introducing coolant into a rotating tap holder.

DESCRIPTION OF THE PREFERRED EMBODIMENTS

The preferred embodiments illustrated are not intended to be exhaustive or to limit the invention to the precise form disclosed. They are choses and described in order to best explain the principles of the invention and its application and practical use to thereby enable others skilled in the art to best utilize the invention.

The threading tap 14 illustrated in FIG. 1 includes a longitudinal thread portion 10 of substantially conventional form and a shank portion 12. Thus, the leading end of thread portion 10 is tapered and the threads 18 thereof may be undercut at 32 to form a tapered cutting tip of the tool. Longitudinal flutes or grooves 19 may be formed in thread portion 10 and extend the full length thereof.

The shank portion 12 of the tap 14 is a cylindrical configuration having one or more longitudinally directed straight grooves or flutes 16 which preferably are aligned with and form continuations of flutes 19 of thread portion 10. The tap shown in FIG. 1 has three flutes which preferably are similar and are preferably equally circumferentially spaced. The number and size of flutes 16 in each shank portion 12 will vary with the size of the tap.

The tap 14 preferably has one or more longitudinal passageways 20 preferably extending the full length thereof. The number and size of the longitudinal passageways formed in a tap will be dependent in part upon the size of the tap and its desired heat transfer characteristics. For smaller taps one longitudinal passageway will generally be sufficient, an d when so used, it is preferably axially located within the tap as shown in FIGS. 1, 2 and 3.

Additionally, a series of radial or lateral bores 22 in communication with longitudinal passageway 20 may be formed in the threaded portion 10 at spaced points opening at the base or venter of each flute 19. Lateral bores 22 are preferably equiangularly spaced about threaded portion 10. Again, the number, size and placement of bores 22 depend upon the size and heat transfer characteristics of the tap. Although lateral bores 22 are shown positioned within flutes 19 in order to facilitate chip removal as well as cooling of the tap, they could be positioned to interrupt threads 18 should the tap have no full length flutes or if it is otherwise advantageous to do so. In any case, it is preferably to have at least one bore 22 positioned in or adjacent the tapered cutting tip of the tap.

The forward end of longitudinal passageway 20 may be threaded at 30. A plug or insert member 32, such as a setscrew, may be inserted into longitudinal passageway 20 at 30 as shown in FIG. 3 to cause coolant fluid entering bore 20 at the shank portion 12 to be entirely discharged through the lateral bores 22. The use of plug member 32 is advantageous when the tap is being utilized to thread a through hole. When tapping a blind hole, plug member 32 may be removed. For some applications, it may be preferable to form the tap with an integral forward end wall over passageway 20.

The rearward end portion 23 of shank portion 12 may be of reduced diameter cylindrical form to provide an annular shoulder 24 and to seat an O-ring or a similar type seal. A circumferential groove 26 is positioned intermediate the length of shank portion 12 and is preferably defined by tapered sidewalls. A circumferential shear groove 28 may be located forwardly of groove 26 in the shank portion 12 at a portion thereof projecting from the tap holder and spaced from thread part 10. The depth, width and location of shear groove 28 are such that if, during the course of threading, a stress is encountered which exceeds the design limit of the tap, fracture will occur at the shear groove 28, thereby providing a portion of the tap shank protruding from the workpiece being tapped which can be gripped by a tool and rotated to back the tap out of the workpiece.

One embodiment of the tap holder is illustrated in FIG. 4 with tap 14 mounted therein. This holder consists of a shank portion 40 of cylindrical or tapered configuration adapted for mounting within the bore of a machine spindle (not shown) and an integral concentric cylindrical socket portion 44. A machine spindle engaging tank 42 may be formed at the rearward end portion 41 of shank portion 40.

Socket portion 44 has an axial bore or socket 46 defined by internal end wall 48 and cylindrical wall 49 which is interrupted by one or more longitudinal part cylindrical grooves 50. These grooves are here shown and are preferably equally spaced circumferentially and terminate at end walls 52. The radius of each groove 50 is greater than the radial displacement of its axis from the socket wall 40 so that each groove 50 communicates throughout its length with the socket 46.

A cylindrical insert or lug 54 preferably slidably fits in each groove 50 and projects along its longitudinal dimension into socket 46 as shown in FIG. 5. The number of grooves 50 and lugs 54 will generally equal the number of flutes 16 in the tap shank. Socket portion 44 has a counterbore 56 formed in its forward end. A circumferential groove 58 may be formed at the inner part of the counterbore 56 within which a lock member 60, such as a split retainer ring, is mounted to engage the ends of the lugs 54.

Tap shank portion 12 is removably mounted within holder socket 46 adjacent end wall 48 with a lug 54 fitting within each tap shank flute 16. Tap shank portion 12, holder socket 46 and lugs 54 are sized so that the tap loosely fits within the tap holder, such as with a clearance in the order of 0.003 inches to 0.020 inches. Holder socket portion 44 has a plurality of threaded radial bores 62 which communicate with holder socket 46 between grooves 50 and which register with groove 26 of tap 14 when the tap is positioned in the tap holder as shown in FIG. 4. A headed screw member 64 is seated within each bore 62. Screw member 64 is preferably sized so that when its head abuts a recessed shoulder 65 in socket portion 44 its tip 63 is positioned within tap groove 26 and spaced from the base of said groove so as to prevent tap 14 from being removed from the holder and still permit the tap to have some freedom of movement laterally within the axial holder socket 46.

A modification of the tap and tap holder of FIG. 4 for use in machines, such as those having indexing turrets, in which the tool is held stationary and the work rotates is shown in FIG. 7. A coolant bore or passage 66 is formed in holder socket portion 44. Passage 66 has an outlet opening at end wall 48 of housing socket 46 which is preferably aligned with bore 20 in a tap 14 mounted in the socket portion 44. An O-ring 68 encircles tap shank part 23 and abuts shoulder 24 at the shank end of tap 14. End wall 48 of socket 46 is preferably annularly recessed to spacedly receive reduced end portion 23 of shank portion 12. The O-ring is of such a cross-sectional dimension that it is squeezed by and in turn sealingly engages recess defining walls 49 and 51, tap portion 23 and tap shoulder 24, which define an annular receiving chamber, as the tap is further urged longitudinally into socket 46 by the camming action of screw members 64 as they engage tapered wall 27 of tap groove 26. Coolant passage 66 may extend radially at 72 and preferably has a threaded inlet 74 adapted for connection with a fitting and a coolant supply conduit (not shown).

For those tapping operations in which the tap is to be rotatively advanced into the workpiece, the tap holder may be modified as shown in FIG. 8. The holder socket portion 44 is preferably shaped to provide two concentric reduced diameter portions 75 and 76 contiguous with shank portion 40 and two circumferential shoulders 77 and 78. Journaled about the small cylindrical portion 76 and positioned adjacent shoulder 78 is a collar member 80. Each end 82 of collar 80 preferably has an concentric recess 84 in each of which is seated a seal ring, such as a labyrinth static type inner seal 86 having an outer seal washer 88. Collar 80 is operatively positioned about cylindrical portion 76 of socket portion 44 by split retaining ring 92 which is mounted in a circumferential groove 90 in the tap shank and which bears against the adjacent seal washer 88. The inner circumferential bearing surface or bore of collar 80 has a circumferential groove 94. A radial bore 96 is formed in collar 80 communicating with circumferential groove 94. Bore 96 may be threaded to receive a fitting connecting a coolant supply conduit (not shown). A coolant passage 98 is formed in the tap holder with one end communicating with a tap passageway 20 and with the opposite end communicating with the circumferential groove 94 of collar 80.

Another means for restraining the longitudinal movement of tap 14 within the tap holder is shown in FIG. 9. An annular out-turned flange 102 if formed about the forward end of socket portion 44. Socket portion 44 also has a plurality of substantially equispaced radial bores 103 which register and communicate with groove 26 in tap 14 when the tap is inserted into the holder. A collar member 104 is slidably mounted about socket portion 44 overlying bore 103 and has a forward circumferential shoulder 106 abutting annular flange 102. The rearward portion 108 of collar 104 has a reduced thickness wall defining an annular cavity to receive a biasing coil spring 112 which encircles socket portion 44. One end of spring 112 abuts the internal shoulder 114 of collar 104 and the other end of the spring abuts a retaining ring 116 mounted within a circumferential groove 118 in socket portion 44. Slidably positioned within each bore 103 are a plurality of balls 120. The inner end portion of each bore 103 is slightly tapered to a diameter less than the diameter of the balls to prevent the escape of the balls into socket 46 when the tap is withdrawn from the holder. The size of the inner opening of each bore 103 is such that with collar 104 overlying bore 103 and engaging the outermost ball the innermost ball partially projects into tap groove 26 spaced from the groove's base and preferably engages tapered sidewall 27 of the groove.

FIG. 10 illustrates a modification of the tap holder of FIG. 9 which includes the rotational collar member 80 with seal rings 86 and 88 about housing 44 as shown in FIG. 8 and previously described.

It will be understood that the invention is not to be limited to the details shown and described herein but may be modified within the scope of the appended claims.

What I claim is:

1. In combination, a threading tap having a threaded portion and an integral elongated shank, said shank having at least one longitudinal straight flute therein, a tap holder having a shank portion and a socket portion, said socket portion having a continuous rigid annular wall and an axial bore interrupted by a longitudinal groove, a longitudinal lug seated in said groove and projecting into said socket bore, means retaining said lug in said groove, said tap shank disposed within said socket bore, means carried by said holder socket portion spaced from said lug and releasably interlocked with said tap shank for restraining said tap against fore and aft longitudinal movement within said holder, said tap shank spacedly fitting within said socket bore with said lug seating loosely in a tap shank flute when said tap shank is interlocked within said socket bore by said tap-restraining means so as to restrain rotation of said shank in said bore and to permit lateral self-centering movement of said tap relative to said holder during the tapping operation.

2. The combination tap and tap holder of claim 1, wherein said tap shank has a circumferential groove formed therein, said holder socket portion has a threaded radial bore in communication with said shank groove when said tap is positioned within said holder, and wherein said tap-restraining means includes a threaded member received in said radial bore and positioned in said shank groove.

3. The combination tap and tap holder of claim 1, wherein said tap shank has a circumferential groove therein, said holder socket portion has a radial bore which communicates with said shank groove when said tap is positioned within said socket bore, and said tap-restraining means includes a member slidably mounted within said radial bore and a releasable means for positioning said member with a portion thereof projecting into said shank groove.

4. The combination tap and tap holder of claim 1, wherein said tap has a longitudinal bore and a radial bore in communication with said longitudinal bore, said radial bore having an opening in a said tap shank flute at the threaded portion of said tap, said holder having a passage in communication with said socket bore and tap longitudinal bore and adapted for connection with a coolant supply, and a resilient seal means interposed between said tap and holder socket portion at parts thereof surrounding said tap longitudinal bore and holder passage.

5. The combination tap and tap holder of claim 4, wherein a collar is journaled about said holder at the mouth of said holder passage, one of said collar and holder having a circumferential groove in communication with said holder passage and adapted for connection with a coolant supply means, and circumferential seal means between said collar and said holder at opposite ends of said collar.